US012749000B2

(12) United States Patent
Maksymov et al.

(10) Patent No.: US 12,749,000 B2
(45) Date of Patent: Sep. 29, 2026

(54) UTILIZING COMPUTATIONAL SYMMETRIES FOR ERROR MITIGATION IN QUANTUM COMPUTATIONS

(71) Applicant: IonQ, Inc., College Park, MD (US)

(72) Inventors: Andrii Maksymov, Hyattsville, MD (US); Jason Hieu Van Nguyen, Hyattsville, MD (US); Igor Leonidovich Markov, Mountain View, CA (US); Yunseong Nam, North Bethesda, MD (US)

(73) Assignee: IonQ, Inc., College Park, MD (US)

( * ) Notice: Subject to any disclaimer, the term of this patent is extended or adjusted under 35 U.S.C. 154(b) by 867 days.

(21) Appl. No.: 18/172,227

(22) Filed: Feb. 21, 2023

(65) Prior Publication Data

US 2024/0127102 A1 Apr. 18, 2024

Related U.S. Application Data

(60) Provisional application No. 63/387,224, filed on Dec. 13, 2022, provisional application No. 63/312,205, filed on Feb. 21, 2022.

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ........ G06N 10/20; G06N 10/40; G06N 10/60; G06N 10/70
See application file for complete search history.

(56) References Cited

U.S. PATENT DOCUMENTS

2019/0042392 A1* 2/2019 Matsuura ............... G06N 10/70
2022/0029639 A1* 1/2022 McClean ............... G06N 10/70
2022/0300849 A1* 9/2022 Tannu .................... G06N 10/20
(Continued)

FOREIGN PATENT DOCUMENTS

WO 2021101829 A1 11/2020

OTHER PUBLICATIONS

R. Shaydulin and A. Galda, "Error Mitigation for Deep Quantum Optimization Circuits by Leveraging Problem Symmetries," 2021 IEEE International Conference on Quantum Computing and Engineering (QCE), Broomfield, CO, USA, 2021, pp. 291-300. (Year: 2021).*
(Continued)

*Primary Examiner* — Esaw T Abraham
*Assistant Examiner* — Enamul M Kabir
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to the use of computational symmetries for error mitigation in quantum computations in QIP systems. In some cases, an example method includes generating a quantum circuit by compiling a quantum program corresponding to a defined quantum computation, generating multiple execution variants of the quantum circuit by applying one or more computation-specific symmetries to the quantum circuit, with the one or more computation-specific symmetries corresponding to the defined quantum computation, causing quantum hardware to execute the multiple execution variants, receiving measurement datasets indicative of computation outputs, and determining a result of the computation by aggregating the measurement datasets.

20 Claims, 12 Drawing Sheets

(56) References Cited

U.S. PATENT DOCUMENTS

| | | | | |
|---|---|---|---|---|
| 2022/0374239 A1* | 11/2022 | Freedman | G06N 10/00 | |
| 2022/0414519 A1* | 12/2022 | McClean | G06N 10/20 | |
| 2023/0196174 A1* | 6/2023 | Cai | G06N 10/70 | 714/37 |

OTHER PUBLICATIONS

Tannu et al., "Ensemble of Diverse Mappings: Improving Reliability of Quantum Computers by Orchestrating Dissimilar Mistakes", Proceedings of the 52nd Annual IEEE/ACM International Symposium on Microarchitecture, (MICRO-52), Oct. 12, 2019, pp. 253-265. (Year: 2019).*

Macaluso et al., ("Quantum Ensemble for Classification a Preprint", Jul. 2, 2020, pp. 1-14. (Year: 2020).*

International Search Report and Written Opinion issued in International Application No. PCT/US2023/062963 mailed May 29, 2024, 15 pages.

Tannu et al., "Ensemble of Diverse Mappings: Improving Reliability of Quantum Computers by Orchestrating Dissimilar Mistakes", Proceedings of the 52ND Annual IEEE/ACM International Symposium on Microarchitecture, (MICRO-52), Oct. 12, 2019, pp. 253-265.

Tannu et al., "Mitigating Measurement Errors in Quantum Computers by Exploiting State-Dependent Bias", Proceedings of the 52nd Annual IEEE/ACM International Symposium On Microarchitecutre, (MICRO-52), Oct. 12, 2019, pp. 279-290.

Macaluso et al., "Quantum Ensemble for Classification a Preprint", Jul. 2, 2020, pp. 1-14, XP093164282, Retrieved from the Internet: URL:https://arxiv.org/pdf/2007.01028v1 [retrieved on May 17, 2024].

* cited by examiner

UTILIZING COMPUTATIONAL SYMMETRIES FOR ERROR MITIGATION IN QUANTUM COMPUTATIONS

CROSS-REFERENCE TO RELATED APPLICATION

This application claims the benefit of and priority to U.S. Provisional Patent Application No. 63/387,224, filed Dec. 13, 2022, and U.S. Provisional Patent Application No. 63/312,205, filed Feb. 21, 2022, the contents of which applications are hereby incorporated by reference herein in their entireties.

TECHNICAL FIELD

Aspects of the present disclosure relate generally to systems and methods for use in the implementation and/or operation of quantum information processing (QIP) systems.

BACKGROUND

Trapped atoms are one of the leading implementations for quantum information processing or quantum computing. Other implementations include those based on superconducting qubits or photonic qubits, for example. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of methods and systems that use computational symmetries to reduce error accumulation in next-generation quantum architectures, including architectures used for QIP systems that handle operations based on atomic-based qubits and/or solid-state-based qubits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
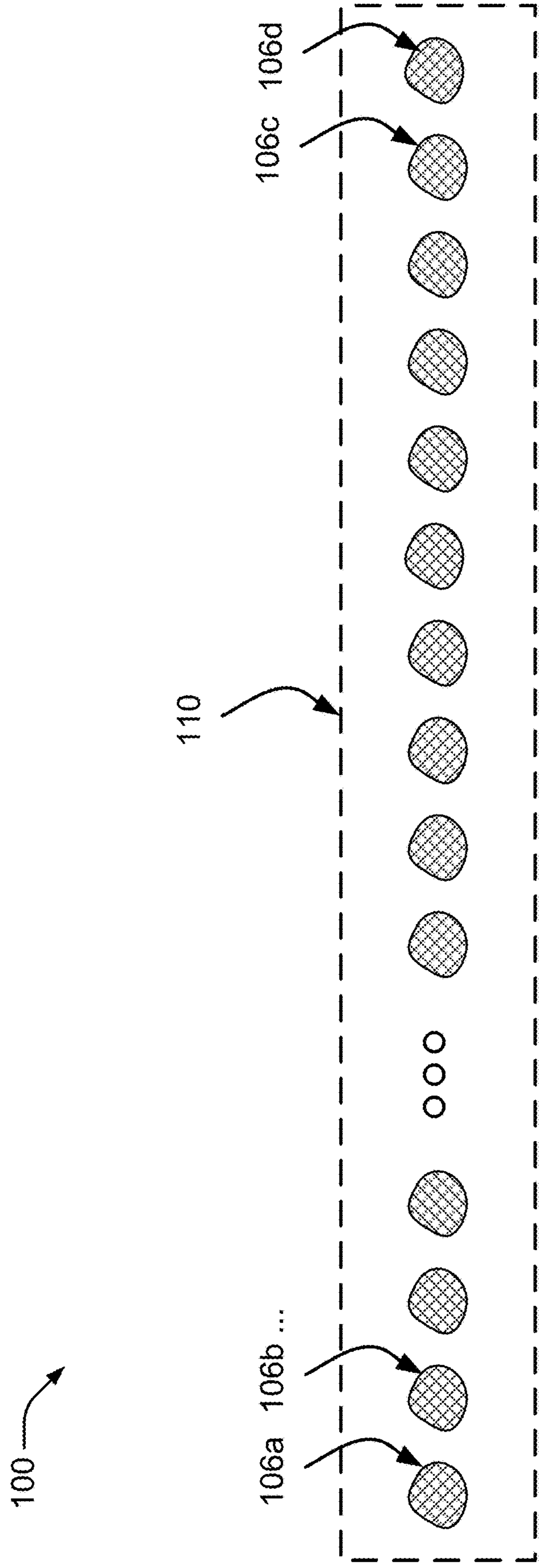
FIG. 1 illustrates a view of atomic ions a linear crystal or chain in accordance with aspects of this disclosure.

The present disclosure recognizes and addressed the issue of error mitigation in quantum computers (QCs). Searching for the best implementation of quantum computation on a physical qubit architecture can present some challenges. Rather than doing so, this disclosure proposes to simultaneously use multiple circuit implementations and/or circuit variations (both collectively referred to as "execution variants") with subsequent aggregation of measured results. This approach promises powerful noise-cancellation and can handle some systematic inaccuracies in quantum circuits but compared to error-correction, this approach uses temporal rather than wide-circuit redundancy. Empirical results demonstrate a performance boost for an ion-trap quantum computer as well as scalable benefits in simulation.

Aspects of the present disclosure, individually or in combination, permit enhancing the performance of quantum computers with high-quality qubits by implementing an error-mitigation approach based on symmetries of computation and nonlinear aggregation. To avoid qubit-level overhead and gate-level overhead, the error-mitigation approach of the present disclosure can distinguish an ideal quantum computation by its invariance under certain symmetries that arise at multiple levels of physical implementation. Such symmetries are referred to as symmetries of computation or computational symmetries. Computational symmetries include computation-specific symmetries that pertain to the particular quantum computation being carried out. Aspects of the present disclosure can first use computational symmetries (e.g., computation-specific symmetries) to generate variant circuit implementations. Such variants can be executed on one or multiple QCs. Collected measurement data (e.g., measurement statistics) can then be aggregated via linear techniques or nonlinear techniques. As a result of such an aggregation, symmetrized effects of deterministic inaccuracies can largely cancel out while random noise does not get amplified.

The error-mitigation approach in accordance with this disclosure provides a tangible improvement to the technological field of quantum information processing (QIP). Indeed, on a commercial trapped-ion quantum computer, the implementation of the error-mitigation approach of this disclosure can improve performance of multiple practical quantum algorithms by a factor of about 100 without qubit overhead and/or gate overhead. More specifically, the error-mitigation approach of this disclosure has been validated on a commercial QC for quantum algorithms of practical interest. For quantum machine-learning (QML) circuits, linear aggregation can improve performance by factors of 1.5 to 2. Nonlinear aggregation by voting can provide much greater gains, in some cases. For a 15-qubit quantum Fourier transform (QFT) adder circuit with voting, aspects of this disclosure provide a performance gain of approximately 100 times over computations without such an aggregation, without distortion.

Further, the error-mitigation approach in accordance with this disclosure can be applicable to multiple types of QIPs and qubit technologies, and is compatible with existing error-mitigation strategies. While various aspects of the error-mitigation approach are described with reference to a QIP system based on trapped-atom qubits, the disclosure is not limited in that respect. Indeed, the error-mitigation approach in accordance with this disclosure can be used in other types of QIP systems based on solid-state qubits. Additionally, while described with reference to qubits, the error-mitigation approach of this disclosure can in some cases be implemented for other types of quantum devices, such as qudit devices.

Solutions to the issues described above are explained in more detail in connection with FIGS. 1-11, with FIGS. 1-3 providing a background of QIP systems or quantum computers, and more specifically, of atomic-based QIP systems or quantum computers.

Figure 2:
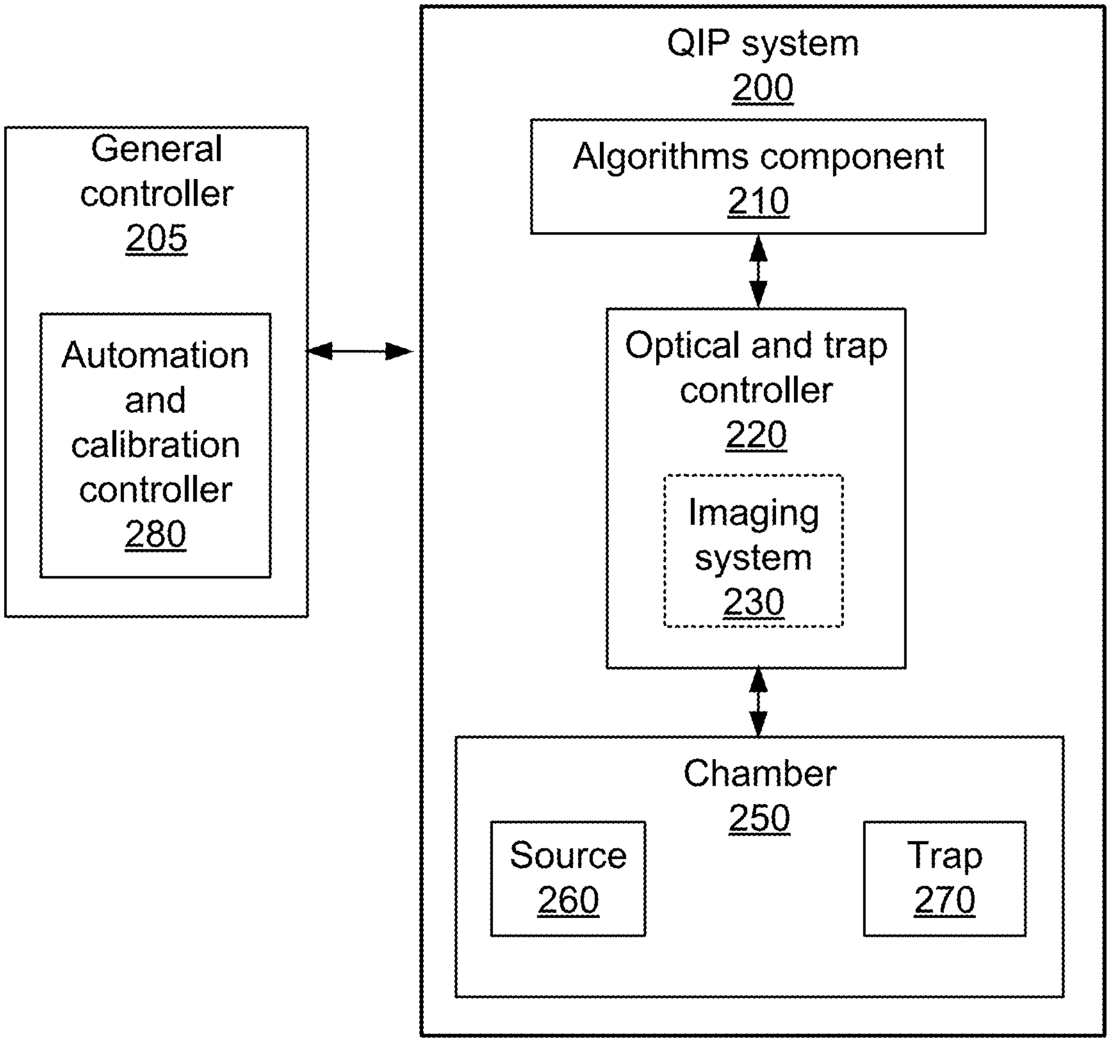
FIG. 2 illustrates an example of a quantum information processing (QIP) system in accordance with aspects of this disclosure.

FIG. 1 shown below illustrates a diagram 100 with multiple atomic ions 106 (e.g., atomic ions 106*a*, 106*b*, . . . , 106*c*, and 106*d*) trapped in a linear crystal or chain 110 using a trap (the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions may be trapped. The atomic ions can be Ytterbium ions (e.g., $^{171}Yb^{+}$ ions), for example. The atomic ions are illuminated with laser (optical) radiation tuned to a resonance in $^{171}Yb^{+}$ and the fluorescence of the atomic ions is imaged onto a camera or some other type of detection device. In this example, atomic ions may be separated by about 5 microns (μm) from each other, although the separation may be smaller or larger than 5 μm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used. The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 shown below is a block diagram that illustrates an example of a QIP system 200 in accordance with various aspects of this disclosure. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

Shown in FIG. 2 is a general controller 205 configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 in a chamber 250, including the generation of signals to control the trap 270, and controls the operation of lasers and optical systems that provide optical beams that interact with the atoms or ions in the trap. When used to confine or trap ions, the trap 270 may be referred to as an ion trap. The trap 270, however, may also be used to trap neutral atoms, Rydberg atoms, different atomic ions or different species of atomic ions. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the general controller 205, the automation and calibration controller 280, and/or the algorithms component 210.

Figure 3:
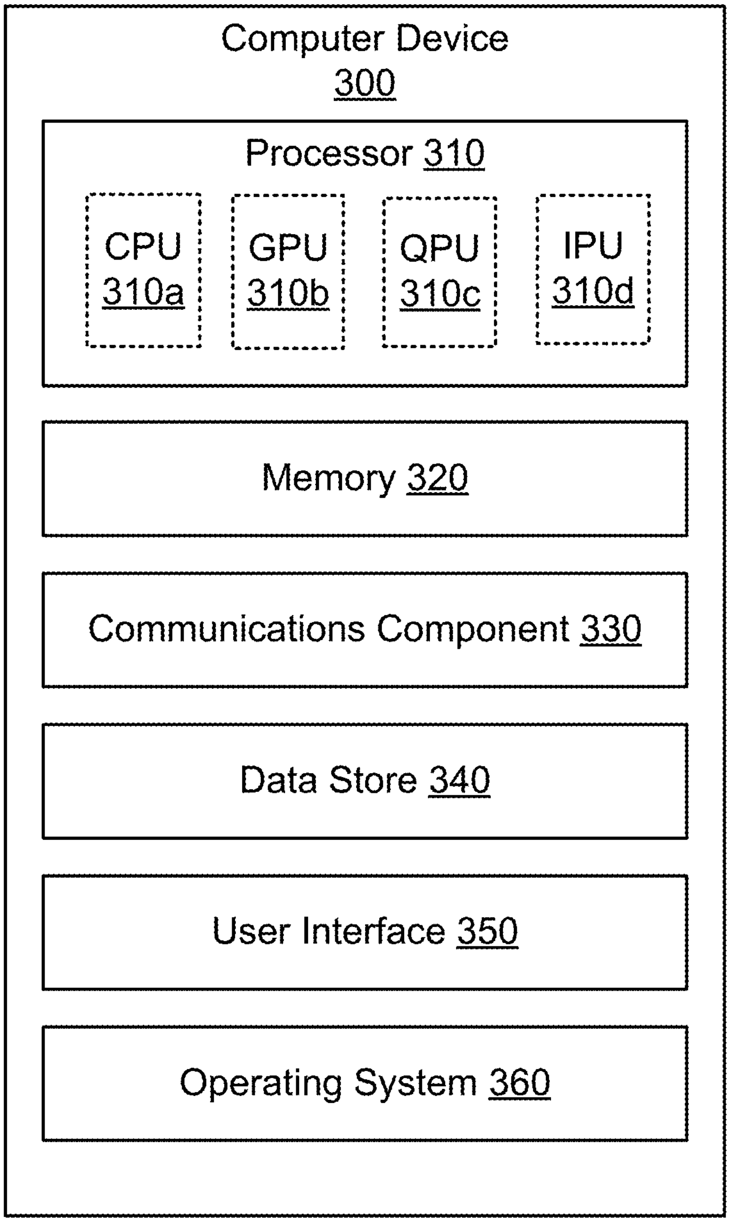
FIG. 3 illustrates an example of a computer device in accordance with aspects of this disclosure.

Referring now to FIG. 3 shown below, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

Figure 4:
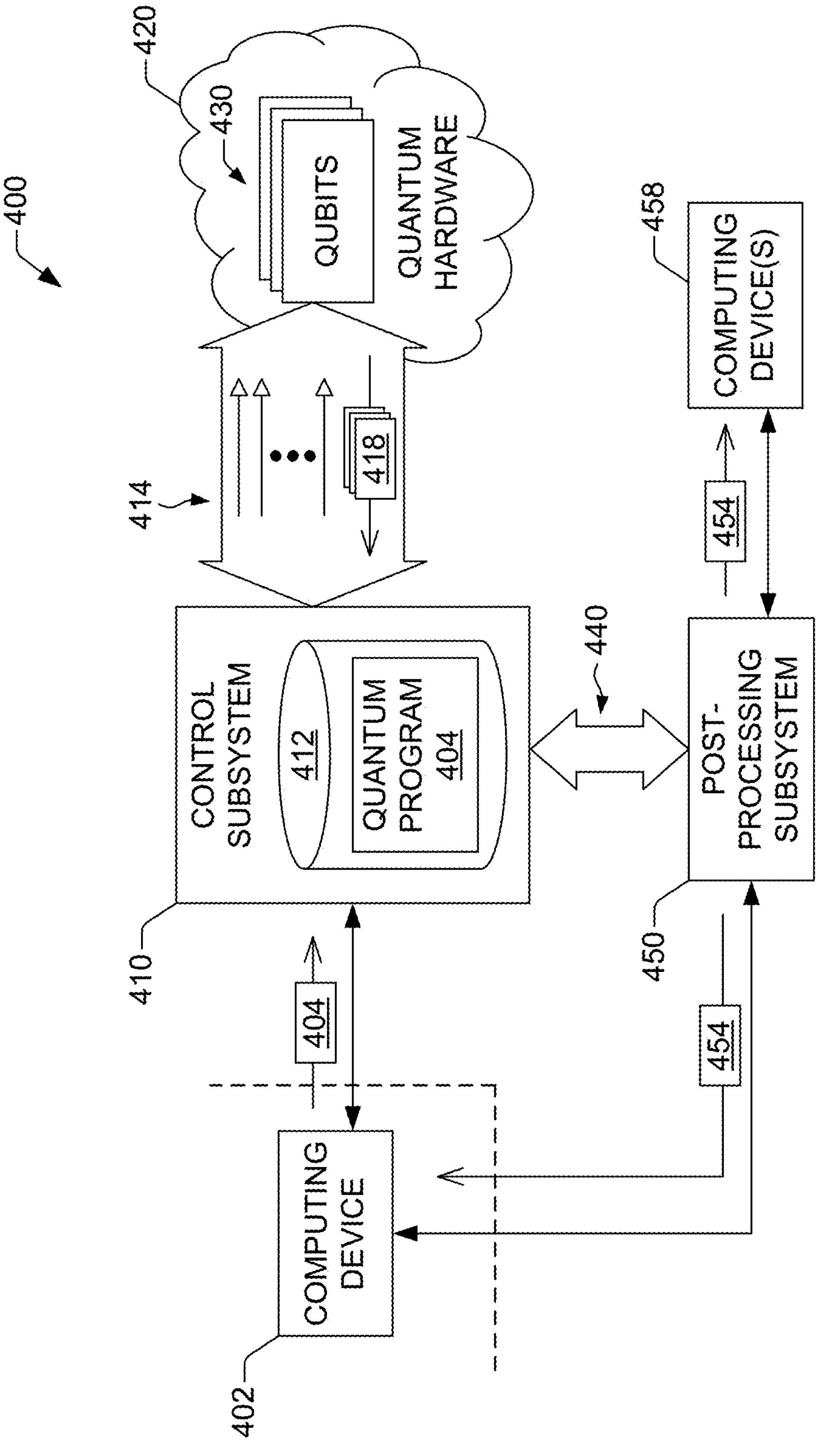
FIG. 4 illustrates another example of a QIP system, in accordance with aspects of this disclosure.

FIG. 4 illustrates an example of a QIP system in accordance with aspects of this disclosure. The example QIP system 400 shown in FIG. 4 includes a control subsystem 410 that can receive a quantum program 404 from a computing device 402 that is remotely located relative to the example QIP system 400 and is functionally coupled (e.g., communicatively coupled) to the control subsystem 410. The computing device 402 can send data defining the quantum program 404 control subsystem 4 for execution in quantum hardware 420, applying the error-mitigation approach described herein. As is indicated by dashed lines, the computing device 402 can be external to the example QIP system 400. For example, the computing device 402 can be a user device (e.g., a classical computer) of an end-user of the QIP system 400. The control subsystem 410 can retain the quantum program 404 in one or more memory devices 412. The quantum program 404 corresponds to a defined quantum computation. The defined quantum computation can be an n-qubit computation, for example. The quantum program 404 can include a quantum circuit (and, in some cases, sub-circuits) representing a quantum algorithm associated with the quantum computation. Examples of the quantum algorithm include a variational quantum algorithm, a machine-learning algorithm, a Fourier transform algorithm, or the like.

The control subsystem 410 can be functionally coupled to quantum hardware 420 via multiple links 414 that permits the exchange of data and/or controls signal between the control subsystem 410 and the quantum hardware 420. The quantum hardware 420 can embody, or can include, one or more quantum computers. In some cases, the quantum hardware 420 embodies a cloud-based quantum computer. In other cases, the quantum hardware 420 embodies, or includes, a local quantum computer. Regardless of its spatial footprint, the quantum hardware 420 includes multiple qubits 430 arranged in a particular layout. Each qubit of the qubits 430 can be coupled to an environment and/or to one another. Such coupling(s) decoheres and relaxes quantum information contained in the qubit. Thus, the quantum hardware 420 can be noisy. The type of the multiple links can be based on the type of qubits 430 used by the quantum hardware 420 for computation. In some cases, the multiple links 414 can include wireline links or optical links, or a combination of both. In other cases, the multiple links 414 can include microwave resonator devices or microwave transmission lines, or a combination of both.

The qubits 430 can include atomic qubits assembled in an atom-trap. Thus, the atomic qubits can be referred to as trapped-atom qubits. In some cases, each one of the atomic qubits can be a neutral atom. In other cases, each one of the atomic qubits can be an ion, such as an Ytterbium ion, a calcium ion, or similar ions. The atomic-qubits in such cases can be confined within an ion-trap (e.g., the trap 270 (FIG. 2) and can be assembled in a linear arrangement (such as the linear crystal or chain 110 (FIG. 1)). In other implementations, the qubits 430 can include solid-state devices of one of several types. Such devices can be embodied in, for example, Josephson junction devices, semiconductor quantum-dots, or defects in a semiconductor material (such as vacancies in Si and Ge, or nitrogen-vacancy centers in diamond).

The control subsystem 410 can cause the quantum hardware 420 to execute each one of multiple execution variants. Such variants are illustrated as single-open-head arrows in FIG. 4. In response, the control subsystem 410 can receive measurement data 418 indicative of computation outputs for respective ones of the multiple execution variants. The measurement data 418 can include multiple measurement datasets, where each measurement dataset is indicative of a computation output of a respective execution variant of the multiple execution variants. A particular execution of a quantum algorithm can be referred to as a "shot" and the control subsystem 410 can cause the quantum hardware 420 to repeat multiple shots for a quantum computation. Thus, the control subsystem can accumulate counts corresponding to one or more measurement outcomes at the qubits 430 as part of execution of the quantum computation. Because the quantum computation can be performed in two or more qubits, a measurement outcome can be represented as a bitstring representing a particular target output state given a particular set of qubits involved in a quantum computation. The control subsystem 410 can supply at least a portion of the measurement data 418 to components of the control subsystem 410 and/or other sub systems (e.g., post-processing subsystem 440).

The control subsystem 410 also can be functionally coupled to a post-processing subsystem 450 via a communication architecture 440. The communication architecture 440 can include wirelines links, wireless links, network devices (such as gateway devices, servers, and the like), or a combination thereof. The post-processing subsystem 450 can apply one or several post-processing techniques to measurement data 418 received from the quantum hardware 420. By applying such techniques, the post-processing subsystem 450 can generate a result 454 of a quantum computation executed by the quantum hardware. The post-processing subsystem 450 can send the result 454 (or data indicative of the result 454) to the computing 402 and/or other computing device(s) 458. The post-processing subsystem 450 also can cause the computing device 402 to present the result 454 in a particular way. For example, the post-processing subsystem 450 can direct the computing device 402 to present a user interface including the result 454.

To address noise and other types of errors (e.g., computational error and miscalibration) in the quantum hardware 420, rather than implementing an error-correction approach, the example QIP system 400 can apply various symmetrization strategies via the error-mitigation subsystem formed by at least the control subsystem 410 and the post-processing subsystem 450. Even without hardware improvement, the symmetrization strategy in accordance with aspects of this disclosure can improve performance of a QC because systematic errors vary between certain symmetric implementations. As is used herein, "symmetrization" refers to the process of creating variant implementations of quantum computation on specific hardware, so as to diminish errors and improve QC performance.

To implement a symmetrization strategy, in some aspects, a set of n-qubit computations $\mathfrak{U}_n$, each including state initialization, some operator from SU $(2^n)$, and final measurements. Let $\mathfrak{R}_n$ be a set of realizations (of all quantum computations in $\mathfrak{U}_n$) that represent gate-level quantum circuits with qubit assignment, initialization, measurements, postprocessing, and possibly implementation details such as pulse sequences specified. A function $\pi$: $\mathfrak{R}_n \rightarrow \mathfrak{U}_n$ finds the computation u performed by a given concrete realization r. The realization r is an execution variant. The realization r is an execution variant. That is, the realization r is particular realization of a quantum algorithm, including the quantum algorithm's gate-level quantum circuit with qubit assignment, initialization, measurements, postprocessing, and possibly implementation details (such as pulse sequences). The general symmetries of $\mathfrak{U}_n$, denoted $\Gamma(\mathfrak{U}_n)$ can be defined as the set of functions $\gamma$: $\mathfrak{R}_n \rightarrow \mathfrak{R}_n$ that satisfy $$\pi \circ \gamma = \pi. \quad (1)$$

That is, $\gamma \in \Gamma(\mathfrak{U}_n)$ if and only if for all $r \in \mathfrak{R}_n$, whenever $\pi(r)=u$, $\pi(\gamma(r))=u$. In other words, applying $\gamma$ to any realization can produce the same quantum computation. Further, computation-specific symmetries, $\Gamma(\mathfrak{U}_n, r)$, can be defined as the set of functions $\gamma$: $\mathfrak{R}_n \rightarrow \mathfrak{R}_n$ that satisfy $\pi(\gamma(r))=\pi(r)$ for a particular realization r. For example, general symmetries could be conjugations (in group-action sense) of gate-level circuits by qubit permutations. Namely, the initial state is replaced by its permutation, the gates are applied on permuted qubits, and the measurement results are permuted back. Examples of computation-specific symmetries are gate decompositions, permutations of commuting gates, the addition of gates that preserve a given state (e.g., before measurement), and changes of gates and measurements compensated by changes in postprocessing. In cases where $\mathfrak{R}_n$ specifies pulse sequences, symmetries can replace them with physically equivalent ones.

Without intended to be bound by theory and/or modeling, by distributing a quantum computation (e.g., an n-qubit computation) over multiple computation-specific symmetries, the effect of control inaccuracies can be cancelled out, at least partially, without amplification of random errors. The example QIP system 400 can implement the error-mitigation technique described herein by implementing various stages including, for example:

1. Define symmetries $\Gamma$ and sample $\Gamma' \subset \Gamma$.
2. Generate circuit variants for $\Gamma'$.
3. Execute each variant on the QC hardware.
4. Aggregate all measurement statistics.

Using all possible symmetries for a given quantum computation is impractical. Accordingly, the example QIP system 400 (FIG. 4) can sample from those symmetries. For an error-free quantum computation, it suffices to use the identity symmetry alone. Assuming a single inaccuracy of a known type, very few symmetries may be sufficient, regardless of the magnitude of inaccuracies or the number of qubits 430. For example, in some scenarios, two symmetries (e.g., qubit assignment and gate decomposition) can be sufficient to attain satisfactory computation performance. As the dimensionality of the error space grows, more symmetries are likely to be sampled. Symmetries $\gamma$ can be sampled to minimize $\langle \delta h_\gamma \rangle \Gamma$. Selecting dissimilar (rather than random, for example) symmetries reduces the bias and decorrelates inaccuracies between variants. In scenarios where symmetries $\Gamma$ are qubit assignments, assignments that share fewer gates between physical qubits for a given device-specific connectivity can be configured or, in some cases, selected by the example QIP system 400. For example, in cases wherein symmetries in qubit assignment are used on 20 qubits, 24 variants can be generated by only permuting the first four qubits and leaving the rest of the qubits unchanged. Such qubit assignments can leave most of the errors the same. Selecting random permutations does not guarantee minimal bias. Ultimately, qubit assignments are selected to have minimum overlap, thus maximum diversity in error accumulation. Similar approach can be used for gate decomposition.

With respect to the sampling or selection of computation-specific symmetries, uniformly random selection provides a computationally scalable sampling method in that the memory of all previously selected symmetries is not necessary to select the next symmetry $\gamma$. Because k uniformly random symmetries produce a uniformly random set of $\delta h_\gamma$, $\langle \delta h_\gamma \rangle \Gamma \propto 1/\sqrt{k}$. Selecting dissimilar symmetries can reduce the expectation $\delta h_\gamma$, similar to how low-discrepancy sequences improve upon random samples. To avoid specializing symmetry selection to each individual computation, the example QIP system 400 (FIG. 4) can rely on a symmetry definition file, for example, that defines one or more symmetries for entire classes of computation. In some cases, this might introduce moderate suboptimality. For example, similar variational quantum eigensolver (VQE) circuits (on the same number of qubits, for example) can be viewed as one class.

Additionally, the example QIP system 400 (FIG. 4) can split a given number of executions of a quantum circuit into batches, and each batch is executed using a different realization (or variant implementation) that should, by symmetry, give the same outcome in the absence of inaccuracies. To aggregate measurement datasets of symmetrized runs, the example QIP system 400 can apply a defined aggregation process to measurement data 418 received from the quantum hardware 420. The aggregation process can include one of a linear aggregation process or a non-linear aggregation process. An example of a linear aggregation process is componentwise averaging. Examples of non-linear aggregation processes include weighted componentwise averaging, plurality voting, and weighted plurality voting. The application of the defined aggregation process to the measurement data 418 can produce strong performance gains on a commercial QC. In some implementations, the aggregation process includes componentwise averaging of frequencies in given histograms indicative of a distribution of computation outputs of respective variant implementations. It suits computations with few or no zeros in the ideal probability distribution, such as VQE circuits or quantum machine learning (QML) circuits. Simply as an illustration, FIG. 7, panel (b) represents with vectors the differences between the histogram of each variant and the ideal histogram. With an appropriate sampling of symmetries, these vectors cancel out and their sum converges to the ideal histogram/result as the number of variants increases. Componentwise averaging is unable to recover zero frequencies in ideal output distributions. It is noted that averaging is related to the set-union operation, whereas set-intersection suggests different aggregation methods. Namely, aggregation processes based on voting and can filter out low-frequency outputs and recover zero frequencies.

Aggregation by componentwise averaging is stable for measurement statistics of any type. As is described herein, applying componentwise averaging can provide a factor of 2 in fidelity improvement for QML and VQE algorithms which produce few low-frequency outputs.

In addition, or in other implementations, the aggregation process includes plurality voting. To apply such an aggregation process, measurement data indicative of computation output for each circuit variant defines a set of bitstrings, one bitstring per shot. Since each variant has the same number of shots, each shot can be represented by the same number of variant bitstrings (see FIG. 6, panel (c) as an illustration). The winning bitstring can be determined by the plurality vote that additionally exceeds a defined voting threshold value. Because the order of bitstrings does not matter, voting per shot is repeated many times over the scrambled orderings of bitstrings in each variant. Scrambling of ordering creates different combinations of bitstrings between variants. If no winning bitstring is found, the defined threshold value can be reduced by one. If no winning bitstring exists for a defined threshold value of two, the example QIP system 400 can provide a componentwise average of variant histograms as a result of a quantum computation—this can be a common implementation for spread-out distributions and/or when available samples lack statistical significance. After accumulating counts from all winning bitstrings, a final histogram can be normalized. The defined voting threshold value can be determined by training runs for a given QC architecture. Executed for a set of circuits with known outputs, the training runs also help to determine optimal numbers of variants, repetitions, gate decompositions etc. These hyperparameters are used for multiple circuits.

By applying plurality voting, a performance improvement of up to 100 times on a 20-qubit commercial QC based on trapped-atom qubits can be attained. Without intending to be bound by theory and/or simulation, due to the nonlinearity of voting, plurality voting can be a stable aggregation strategy for ideal output probabilities with l equally probable outputs and r−l zero frequencies. That is, plurality voting can be stable for this measurement statistics having at least one zero-frequency output where the output result is encoded in a small set of target output states. Whether or not the set of target output state is small is dictated by the size of Hilbert space associated with qubits involved in a quantum computation and number of measurements. For example, for a circuit on a 20-qubit QC, a set of 16 target output states is a small set. Yet, that same set would not be small for a circuit on four qubits, given that 16 target output states span the entire Hilbert space for the four qubits. Relevant quantum circuits include QFT-based adders, phase and amplitude estimation algorithms, some Monte Carlo algorithms, for example.

With respect to aggregation, it is noted that runtime and memory complexity can depend on the number of observed output states rather than the number of all possible states. For componentwise averaging, the postprocessing involved in the aggregation includes the simple or weighted merger of output counts (zero frequencies are implicit). Plurality voting can be performed in small groups of outputs and, thus, the post-processing that is involved does not require significant memory. For example, memory usage does not exceed the size of all measured data plus the output result.

Figure 5A:
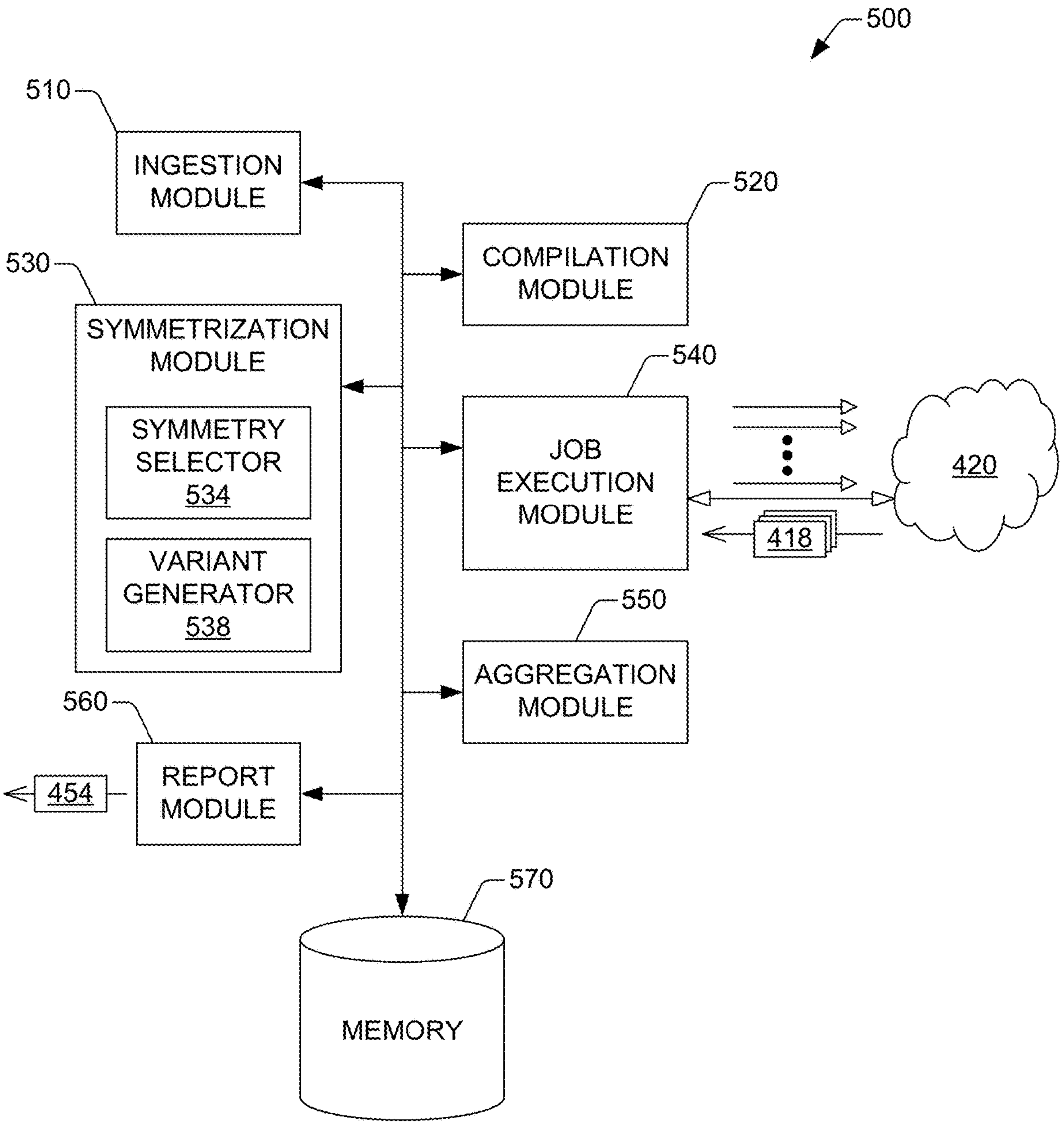
FIG. 5A illustrates an example of an error-mitigation subsystem that can be part of the QIP system shown in FIG. 4, in accordance with aspects of this disclosure.

The control subsystem 410, the post-processing subsystem 450, and the communication architecture 440 can include one or multiple computing devices that can form an error-mitigation subsystem. The error-mitigation subsystem can include various computing resources that permit hosting and executing one or more modules for causing the execution of the quantum program 404 in the quantum hardware 420, via the qubits 430. in accordance with aspects of this disclosure. FIG. 5A presents an example of the error-mitigation subsystem, simply as an illustration. In some cases, the error-mitigation subsystem 500 shown in FIG. 5A can be hosted by the computer device 300 (FIG. 3) or a system of computing devices having the architecture of the computer device 300. In other cases, the error-mitigation subsystem 500 shown in FIG. 5A can be embodied in, or can be hosted by, a computing system 580 shown in FIG. 5B.

Simply as an illustration, the error-mitigation subsystem 500 can implement symmetrization strategies in accordance with aspects of this disclosure. The error-mitigation subsystem 500 can include an ingestion module 510 that can receive the quantum program 404 (FIG. 4). As mentioned, the quantum program 404 can include one or several quantum circuits representing a quantum algorithm, such as a variational algorithm (e.g., a VQE algorithm), a Fourier transform, a machine-learning algorithm, or the like.

The error-mitigation subsystem 500 can include a compilation module 520 that can compile the quantum program 404. As a result, the compilation module 520 can generate a quantum circuit. To compile the quantum program 404, the compilation module 520 can apply one or several optimizations.

Using the quantum circuit, the error-mitigation subsystem 500 can include a symmetrization module 530 that can generate multiple execution variants (including, in some cases, circuit variants). To that end, the multiple execution variants can apply one or more computation-specific symmetries to the quantum circuit. As is described herein, in some cases, rather than using a complete set of computation-specific symmetries, the symmetrization module 530 can include, or can use, a symmetry selector component 534 that can sample the complete set of computation-specific symmetries. In this way, the symmetry selector component 534 can select (or otherwise identify) at least one computation-specific symmetry from the complete set of computation-specific symmetries. Such a set can include at least one of a qubit assignment, gate decomposition, a permutation of commuting gates, an addition of a gate that preserves a defined state, or a change of one or more gates and measurements compensated by one or more changes in postprocessing.

The error-mitigation subsystem 500 can include, or can be functionally coupled to, a job execution module 540 that can cause the quantum hardware 420 (FIG. 4) to execute each one of the multiple execution variants. Such variants are illustrated as open-head arrows in both FIG. 4 and FIG. 5A. The multiple links 414 are represented by a single arrow with double open arrowheads. In response to execution of the execution of the multiple execution variants, the job execution module 540 can receive measurement data (e.g., measurement data 418 (FIG. 4)) indicative of computation outputs for respective ones of the multiple execution variants. The measurement data include multiple measurement datasets, wherein each measurement dataset is indicative of a computation output of a respective execution variant of the multiple execution variants.

The error-mitigation subsystem 500 can include an aggregation module 550 that can determine a result (e.g., the result 454 (FIG. 4)) of the defined quantum computation (e.g., an n-qubit computation) corresponding to the quantum program 404. To that end, the aggregation module 550 can aggregate the multiple measurement datasets by applying an aggregation process (e.g., componentwise averaging or plurality voting). In this way, as is described herein, errors in the result of the defined computation can be mitigated. The aggregation module 550 can be retain the result within one or more memory devices 570 (referred to as memory 570).

The error-mitigation subsystem 500 can include a report module 560 that can cause a computing device (such as the computing device 402 (FIG. 4)) to provide the result. The computing device can be remotely located relative to the error-mitigation subsystem 500. Providing the result can include displaying a user interface that includes one or more indicia representative of the result.

Figure 5B:
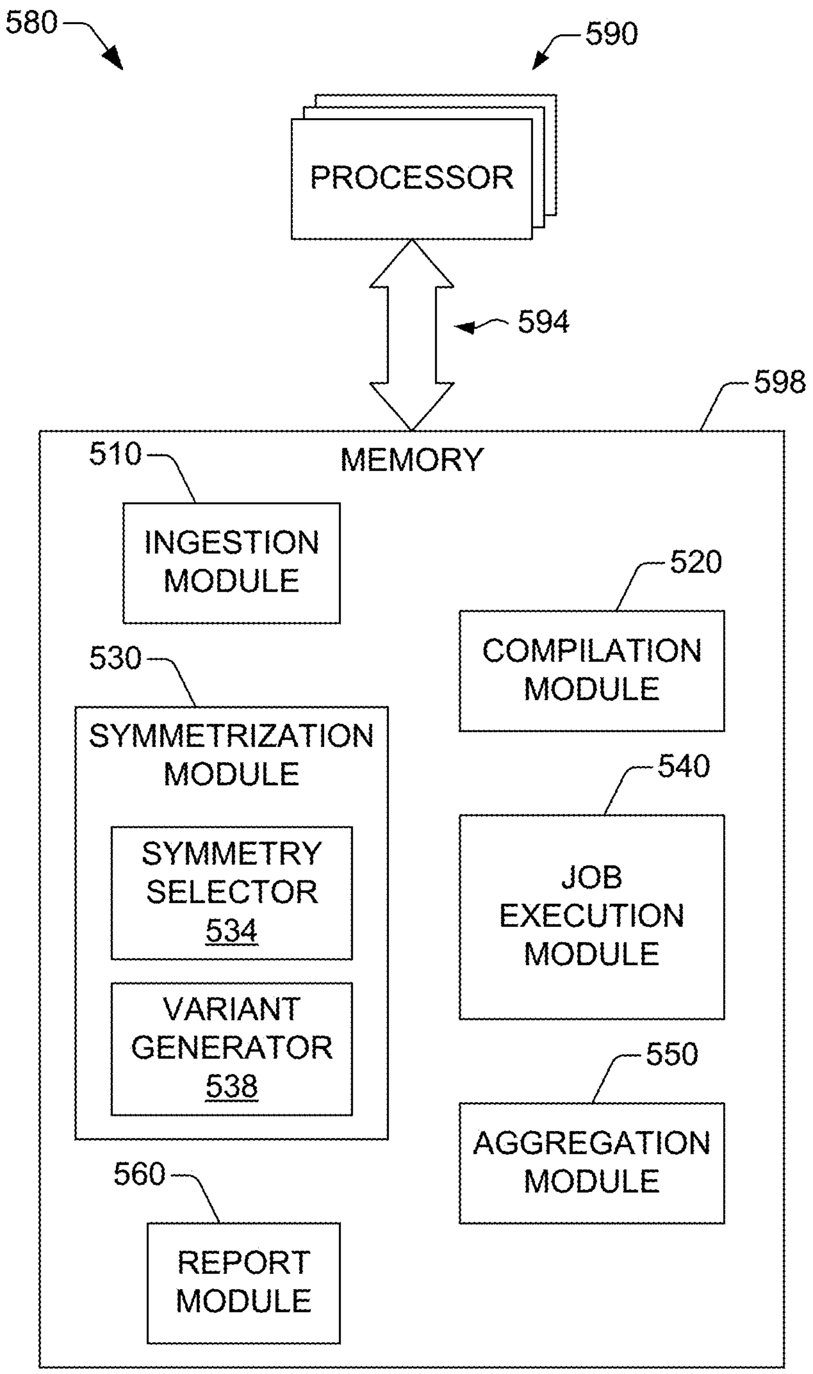
FIG. 5B illustrates another example of the error-mitigation subsystem that can be part of the QIP system shown in FIG. 4, in accordance with aspects of this disclosure.

As mentioned, the error-mitigation subsystem 500 can be embodied in, or hosted by, the computing system 580 shown in FIG. 5B. Accordingly, the computing system 580 can implement error-mitigation based on computational symmetries, in accordance aspects described herein. The computing system 580 can include at least one processor 590 and at least one memory device 598 (referred to as memory 598). In some embodiments, the processor(s) 590 can be arranged in a single computing apparatus (a blade server device or another type of server device, for example). In other embodiments, the processor(s) 590 can be distributed across two or more computing apparatuses (e.g., multiple blade server devices or other types of server devices).

The processor(s) 590 can be operatively coupled to the memory 598 via one or several communication interfaces 594, for example. The communication interface(s) 594 can be suitable for the particular arrangement (localized or distributed) of the processor(s) 590. In some embodiments, the communication interface(s) 594 can include one or multiple bus architectures for communication of data and/or control signals. Examples of the bus architectures include Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

The memory 598 can retain or otherwise store therein machine-accessible components (e.g., computer-readable and/or computer-executable components) and data in accordance with this disclosure. As such, in some embodiments, machine-accessible instructions (e.g., computer-readable and/or computer-executable instructions) embody or otherwise constitute each one of the machine-accessible components within the memory 598. The machine-accessible instructions can be encoded in the memory 598 and can be arranged to form each one of the machine-accessible components. The machine-accessible instructions can be built (e.g., linked and compiled) and retained in computer-executable form within the memory 598 or in one or several other machine-accessible non-transitory storage media. Specifically, as is shown in FIG. 5B, in some embodiments, the machine-accessible components include the ingestion module 510, the compilation module 520, the symmetrization module 530, the job execution module 540, the aggregation module 550, and the report module 560. The memory 598 also can include data (not depicted in FIG. 5B) that permits various of the functionalities described herein. The memory 598 can include the memory 570 (FIG. 5A) in some cases. In some cases, the symmetrization module 530 can include the symmetry selector 534 and the variant generator 538. In some cases, the memory 930 can retain definition of computational symmetries. Such definitions can be used for sampling (or selection) of particular computational symmetries for the symmetrization of a quantum computation, in accordance with aspects described herein.

The machine-accessible components, individually or in a particular combination, can be accessed and executed by at least one of the processor(s) 590. In response to execution, each one of the machine-accessible components can provide the functionality described herein in connection with using computational symmetries for error mitigation in a quantum computation. Accordingly, execution of the machine-accessible components retained in the memory 598 can cause the error-mitigation subsystem 500 to operate in accordance with aspects described herein. More concretely, at least one of the processor(s) 590 can execute the machine-accessible components to cause the error-mitigation subsystem 500 to use computational symmetries for error-mitigation in quantum computations, in accordance with aspects of this disclosure.

Although not illustrated in FIG. 5B, the computing system 580 also can include other types of computing resources that can permit or otherwise facilitate the execution of the machine-accessible components retained in the memory 598. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 598 also can include programming interface(s) (such as APIs); an operating system; software for configuration and or control of a virtualized environment; firmware; and similar.

Figure 6:
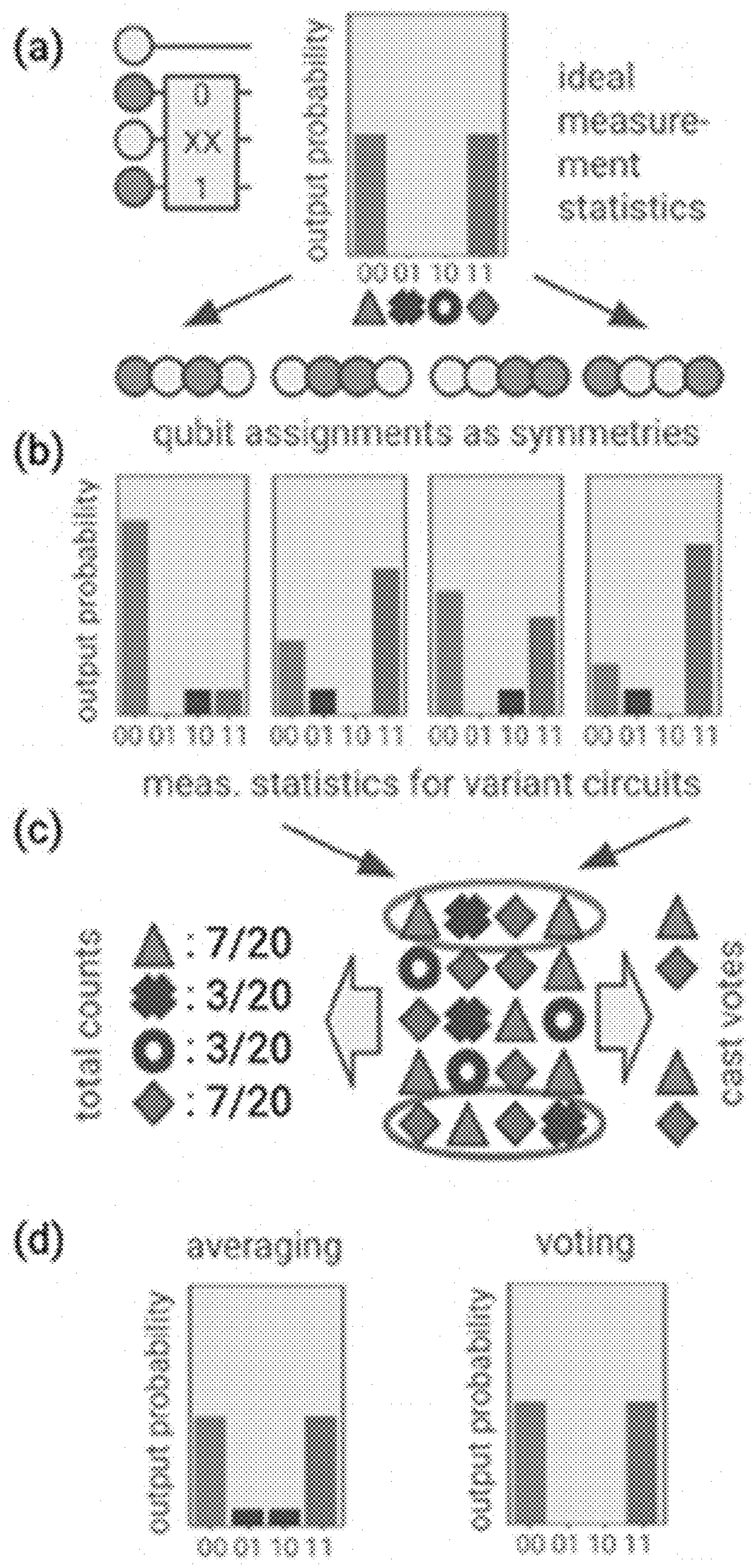
FIG. 6 is a schematic diagram of an example implementation of the error-mitigation approach, in accordance with aspects of this disclosure.

FIG. 6 schematically depicts an example implementation of the error-mitigation approach in accordance with aspects of this disclosure. Such an implementation can be referred to as symmetrized circuit execution and includes splitting execution into symmetrized variants, illustrated by varying qubit assignments, as is shown in panel (a). The symmetrized circuit execution also includes measuring each result affected by individual inaccuracies, as is shown in panel (b). The symmetrized circuit execution also includes aggregating measurement statistics, as is shown in panel (c). As applied by the example QIP system 400 (FIG. 4), the symmetrized circuit execution also can cause a device (such as a user device) to present a comparison of the difference between averaged results and results obtained through plurality voting. Such a comparison is illustrated in panel (d) of FIG. 6.

More specifically, first, for each qubit pair of four selected qubit pairs, an execution variant produces a superposition state $(|00\rangle+|11\rangle)/\sqrt{2}$ (target qubits are represented by dark grey circles; see panel (a)). For each qubit pair, the output state is recreated and measured five times in the computational basis, as is depicted in panel (b) in FIG. 6. If the measurements are grouped per mapping, their statistics significantly deviate from the ideal output probability distribution, but approach the ideal output distribution when averaged; residual erroneous counts are shown as grey circles and crosses, while all-zero states are triangles, all-one are diamonds (c). When aggregated with plurality vote taken across variants, erroneous counts are filtered out, whereas componentwise averaging preserves all counts, as is shown in panel (d) in FIG. 6.

Without intended to be bound by theory and/or modeling, the error-mitigation approach of this disclosure; that is, the symmetrization approach is effective for at least the following reasons. Let inaccurate realizations $\tilde{r}_u$ be determined by instantaneous parameters of the physical system, such that $\pi(\tilde{r}_u)=u+\delta u$. An example is unitary under-rotations or over-rotations of particular gates.

Further, to mitigate the impact of inaccuracies, $\gamma(\tilde{r}_u)$ is considered for multiple $\gamma\in\Gamma=\Gamma(\mathfrak{U}_n, r_u)$ so as to symmetrize the error term in $\pi(\gamma(\tilde{r}_u))=u+\delta u_{\Gamma\text{-}inv}+\delta u_\gamma$. In the absence of errors, all realizations $r_u$ of u implement the same quantum computation. In the presence of errors, symmetrization over multiple $\gamma\in\Gamma$ is relied upon to produce a quantum computation $u+\delta u_{\Gamma\text{-}inv}+\langle\delta u_\gamma\rangle_\gamma$. As long as an uncorrelated set of $\gamma$ is selected, $\|\langle\delta u_\gamma\rangle_\Gamma\|\ll\langle\|\delta u\gamma\|\rangle_\Gamma$, and the cumulative effect of non-$\Gamma$-invariant errors is much reduced.

Further, rather than aggregating all $\pi(\gamma(\tilde{r}_u))$, the example QIP system 400 can use the output states produced by $\pi(\gamma(\tilde{r}_u))$ and aggregate their measurement statistics (because coherently adding two quantum states would require additional qubits, for example). The impact of inaccuracies on an ideal distribution $h_u \in \mathbb{R}^+(2^n)$ may be expressed as $h_u + \delta h_{\Gamma\text{-}inv} + \delta h_\gamma$. Aggregating measurement statistics can "enhance the contrast" between the target output states and erroneously observed states. The error terms may cancel out, but more typically they would be uncorrelated. For example, if $h_u=(0, \ldots, 1_k, \ldots, 0_{2^n})$ and $\Gamma=S_{2^n}$, then the symmetrized result would be $$h_u + \delta h_{\Gamma\text{-}inv} + \langle \delta h_\gamma \rangle_\Gamma = h_u + \delta h_{\Gamma\text{-}inv} = \left(\frac{\varepsilon}{2^n-1}, \ldots, (1-\varepsilon)_k, \ldots, \frac{\varepsilon}{2^n-1}\right) \quad (2)$$

where ε is the average error on k and Γ is sufficiently large. The probability of output k is no better, but other probabilities (that should ideally be 0) become less pronounced. This decreases the probability that an erroneous output is observed repeatedly by chance and thus can permit finding the desired outputs with fewer samples.

The term $\delta h_{\Gamma\text{-}inv}$ in Eq. (2) can capture the remaining fully-depolarizing error channel; that is, the effect of incoherent errors. This residual error can be reduced with aggregation techniques such as plurality voting, e.g., for $h_u$ with l output states of frequency $$\frac{1}{l} \text{ if } \varepsilon < 1 - l/2^n.$$

Figure 7:
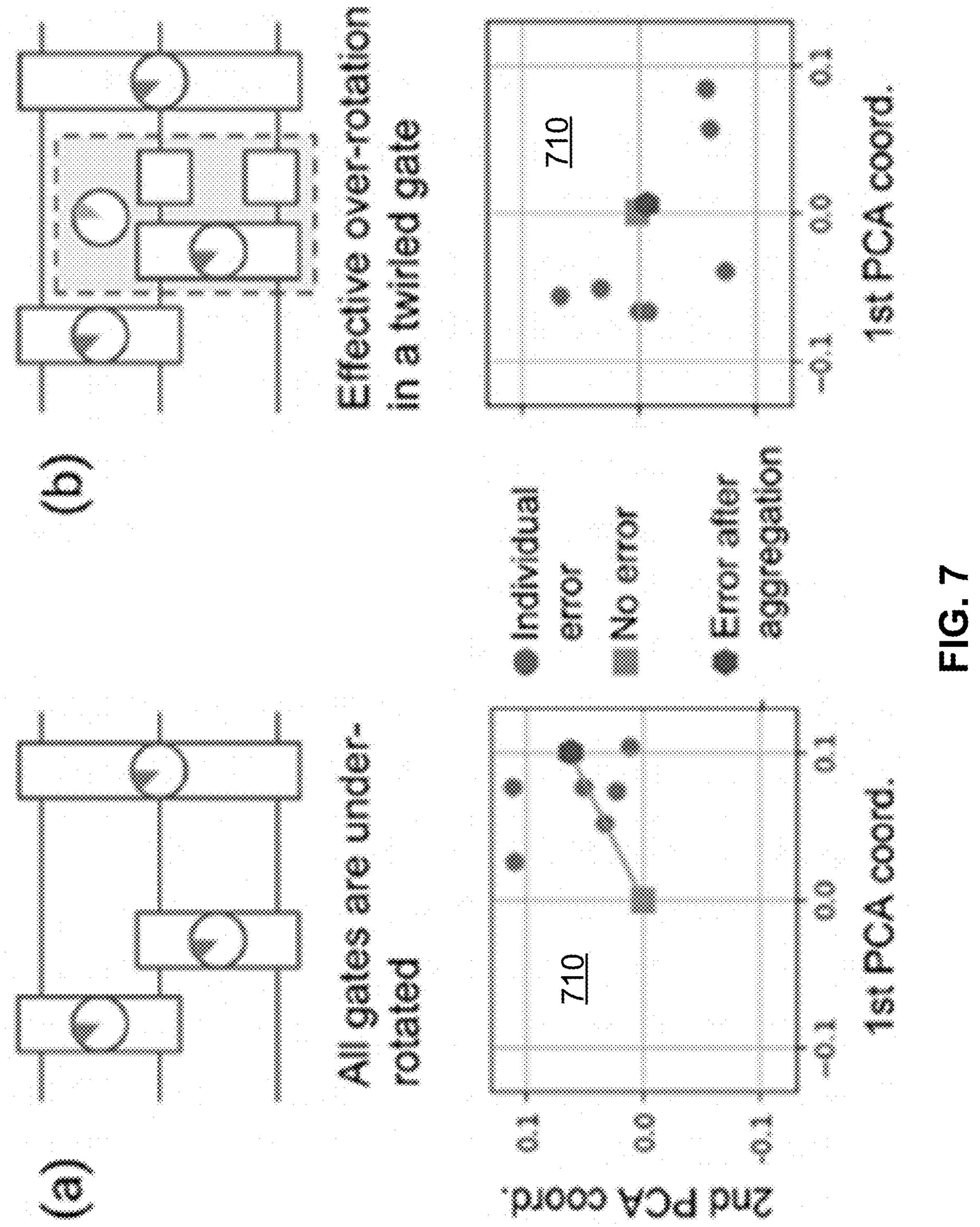
FIG. 7 illustrates simulation results for symmetrized 4-qubit circuits (on eight ions) with average under-rotation on all qubit pairs, in accordance with aspects of this disclosure.

Further, as a concrete example, the effect of symmetrization is demonstrated on 4-qubit circuits (on eight trapped-ion qubits) with six two-qubit gates on different qubit pairs and random single-qubit gates mapped to eight ions. Gate miscalibrations are modeled as random under-rotations of multiple two-qubit gates fixed per qubit pair. An average under-rotation across all qubit pairs causing a similar error for all variant is assumed, as is depicted in FIG. 7, panel (a). Symmetries Γ are represented by eight random qubit assignments γ. For each qubit assignment, corresponding inaccurate realizations were simulated in order to obtain vectors $h_u + \delta h_{\Gamma\text{-}inv} + \delta h_\gamma$. Specifically, in FIG. 7, panel (a) illustrates the use of qubit remappings as symmetries, while panel (b) illustrates combined use of qubit remapping and gate twirling. In panels (a) and (b), similar quantum circuit blocks are contrasted. Circles with dark-grey sectors mark gates with under-rotation while light-grey sectors mark gates with over-rotation. Dark-grey sectors are slanted in one direction and light-grey sectors are slated in another direction. As is noted in FIG. 7, all gates are under-rotated. Individual output errors are shown for simulations of eight mappings of a random circuit on eight qubits with under-rotations specified per two-qubit gate.

FIG. 7 illustrates 256-dimensional vectors for ideal, individual, and symmetrized results by plotting their two largest principal components (principal component analysis (PCA) was initially performed on $\delta h_{\Gamma\text{-}inv} + \delta h_\gamma$ vectors). Charts 710 and 760 present the errors after aggregation in the space of the first two principal components of the deviation from the ideal histogram for biased (panel (a)) or symmetrized (panel (b)) inaccuracies. In the first case, since all gates are under-rotated by some amount on average, the variants fail to symmetrize the errors because they are only exploring qubit assignment symmetries. Hence, error effects $\delta h_{\Gamma\text{-}inv}$ remain after aggregation as is shown in chart 710. In the second example depicted in chart 760, additional symmetries of gate decompositions are used to zero out $\delta h_{\Gamma\text{-}inv}$. The effect of under-rotation in fully-entangling XX gates is addressed using an alternative implementation that combines phase-flipped $XX^{-1}$ gates with pairs of X-gates, thus implementing the same ideal unitary but reversing the effect of under-rotation.

In the present disclosure, an aggregation strategy for measurement statistics is a process that combines measurement statics from multiple implementations of the same computation. Without errors, all implementations should produce identical statistics in the limit (with infinite repetition count). An aggregation strategy is considered stable for a given type of statistics if, provided a set of identical statistics of this type, it produces another copy. Aggregation by componentwise averaging is trivially stable for statistics of any type. Yet, aggregation by voting is not. This can be seen for the probability distribution (1−ε, ε) which voting-based aggregation brings closer to (1, 0) for ε<½. Without intending to be bound by conjecture and/or interpretation, what makes aggregation strategies useful is that (i) they coerce arbitrary statistics to statistics of the desired type, (ii) they distill original statistics from multiple erroneous variants of the original. To this end, output probability distributions are analytically characterized for many quantum algorithms including Shor's and Grover's. The choice of aggregation can be determined by the type of output probability distribution of a given quantum algorithm.

For best performance, aggregation by plurality voting can be used for quantum algorithms with ideal measurement statistics comprising l outputs with frequencies $$\frac{1}{l}.$$

Such quantum algorithms have zero-frequency outputs and a subset of target outputs that needs to be determined. For quantum algorithms with different measurement statistics, aggregation by averaging can be used instead. By using aggregation by averaging, distortion can be avoided.

The impact of symmetrization and the choice of aggregation strategy is also validated herein experimentally by comparing results of unsymmetrized computations to symmetrized computations with componentwise averaging and plurality voting. Experiments have been performed in a quantum computer configured to utilize 20 individually addressable qubits. More specifically, the quantum computer is a trapped-ion quantum computer that utilizes trapped Ytterbium ions individually addressed by pulses of 355 nm light. These pulses can be engineered to generate a Mølmer-Sørensen entangling gate between ions as well as single qubit rotations/gates. The quantum computer uses 22 such ions as qubits to perform quantum information processing. In this disclosure, the experiments are split into 25 different maps (variants) between physical and computational qubits, running 100 experimental shots on each variant resulting in 2500 total experimental repetitions. For circuits on more than six qubits, permutations on a set of physical qubits were generated. Otherwise, two additional physical qubits were utilized to increase the number of diverse mappings. All variants were measured under similar conditions. To that end, for most of the experiments, computation jobs were executed within one calibration cycle. In situations where execution was not feasible within a single calibration cycle (e.g., due to ion-chain loss), the calibration parameters were carefully replicated.

Quantum computer performance is measured by Hellinger fidelity, defined as a statistical overlap $F_H=(\Sigma_i\sqrt{p_i q_i})^2$ between the actual output statistics $p_i$ and the ideal result $q_i$ is computed via an error-free simulator. The statistical overlap $F_H$ ranges from 0 to 1, with 0 capturing probability distributions that do not overlap, and 1 corresponding to a pair of identical distributions. Also known as the Bhattacharyya coefficient, $F_H$ is commonly used to measure the discrepancy between probability distributions and is consistent with the definition of fidelity for quantum states.

Figure 8:
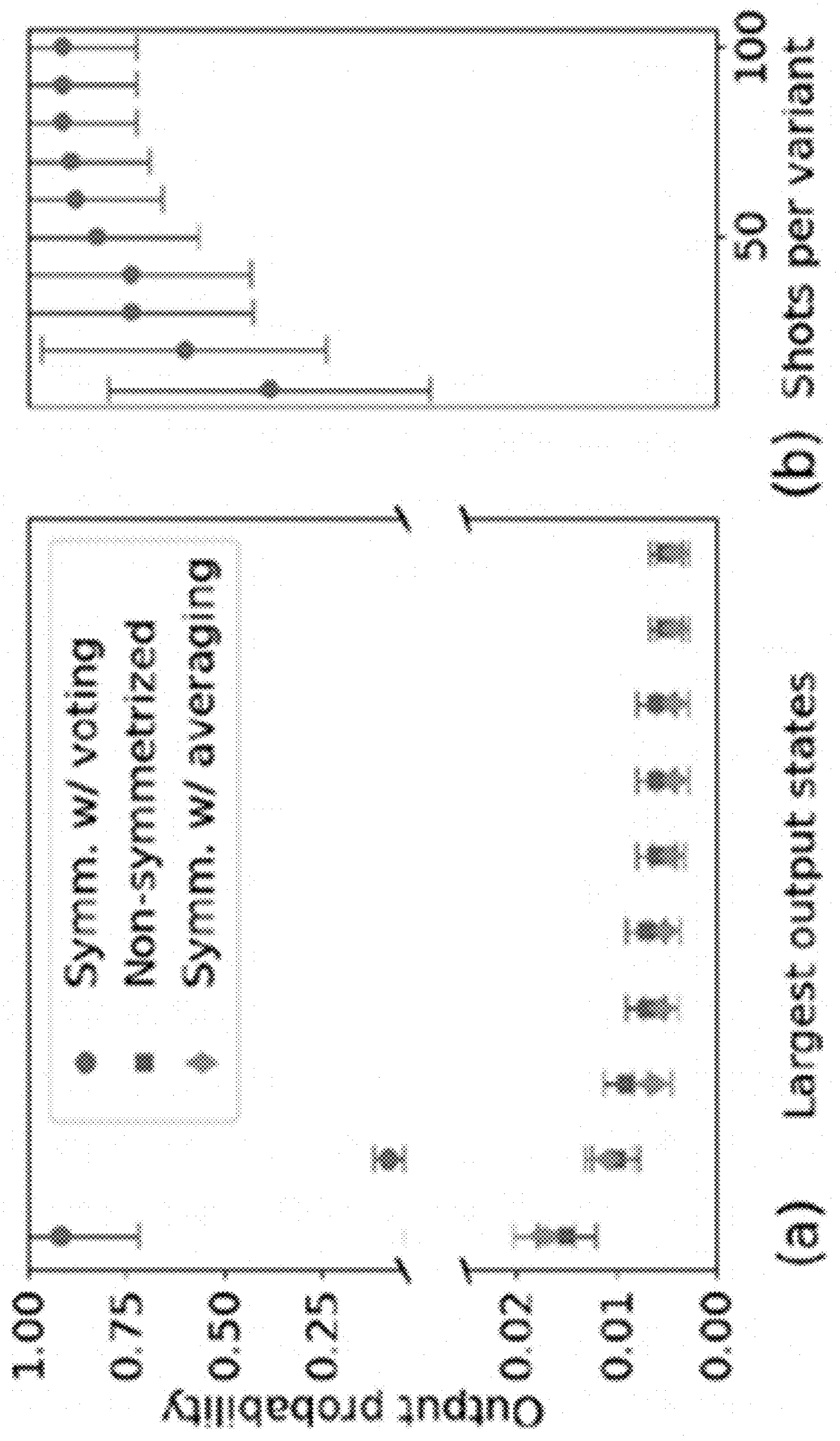
FIG. 8 illustrates the impact of symmetrization on a 13-qubit single-output QFT-based adder circuit. in accordance with aspects of this disclosure.

The impact of symmetrization is demonstrated on a 13-qubit single-output QFT-based adder circuit. In FIG. 8, panel (a), the largest output probabilities out of $2^{13}$ are compared between the unsymmetrized histogram, symmetrized with componentwise averaging, and symmetrized with plurality voting. The first and largest value corresponds to the bitstring with ideal probability 1 while the rest should have output probability 0. Squares show unsymmetrized results, using a single realization with 2500 repeated measurements (the total number of experiments is the same in all three cases). Diamonds represent the symmetrization of this execution with 25 realizations and 100 repetitions per variant, aggregated with componentwise averaging. Circles use the same realizations as diamonds, but the symmetrized histogram is generated with plurality voting. FIG. 8, panel (b), illustrates the change in the error bars with the number of shots per variant. In this case, the symmetrized results keep improving up until around 80 repetitions per variant. It can be gleaned from FIG. 8 that symmetrization with componentwise averaging does not improve the probability of the target bitstring but does reduce next-largest probabilities, which allows for a dramatic increase in the probability of the target state after plurality voting (from about 1.5% to about 95%). The probability of the target outcome is boosted because outcomes not matched between variants are filtered out. For a 15-qubit QFT-based adder, the improvement exceeds two orders of magnitude.

Figure 9:
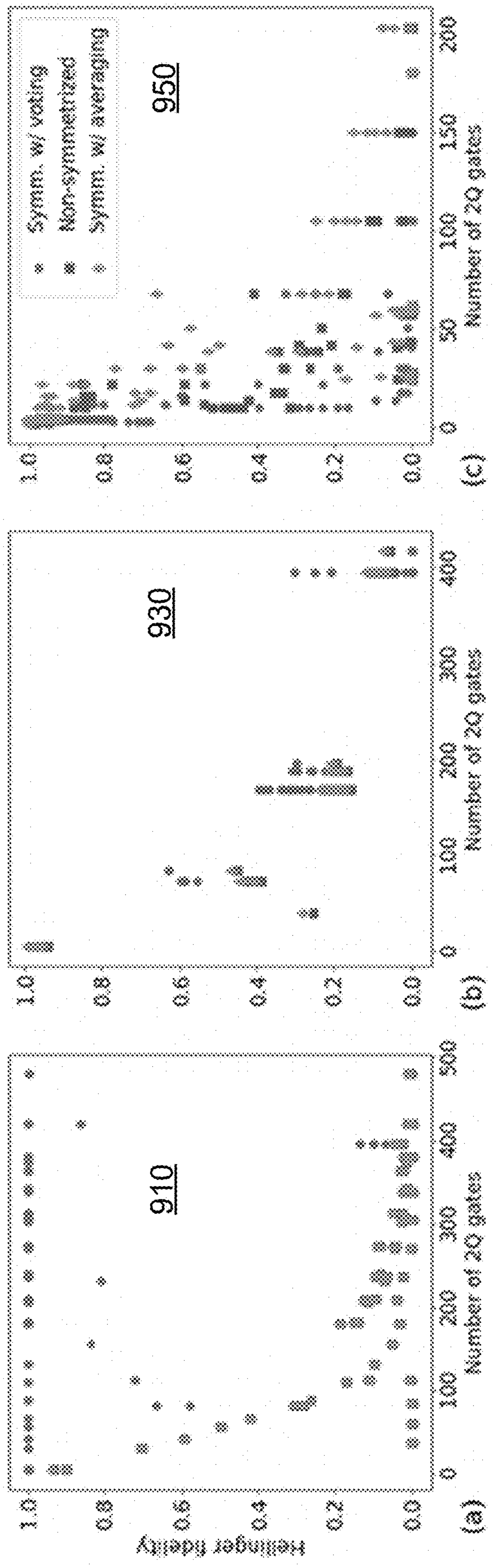
FIG. 9 illustrates a comparison of fidelity improvement for various algorithms, with and without symmetrization, in accordance with aspects of this disclosure.

The effect of symmetrization on performance of other computations also can be evaluated. For example, the effect if symmetrization on performance for several use cases is shown in FIG. 9, where panel (a) illustrates performance of algorithms with one output state (quantum Fourier transform-based adders, phase estimation, and amplitude estimation); panel (b) illustrates performance for algorithms with four output states (amplitude estimation and Monte Carlo sampling); and panel (c) illustrates performance for algorithms with multiple output states (variational quantum eigensolvers and quantum machine learning). Performance is represented by Hellinger fidelity, which metric is shown in FIG. 9 as a function of circuit depth, expressed in the number of two-qubit (2Q) Mølmer-Sørensen (MS) gates. Unsymmetrized and symmetrized results are shown for the same set of experiments, each consisting of 25 realizations with 100 repetitions per variant. Unsymmetrized fidelities are calculated as averages over 25 individual fidelities of each variant. Hence, for the algorithms with one output state, the unsymmetrized fidelities match exactly with the symmetrized results aggregated with componentwise averaging in panel (a).

More specifically, all jobs had 2500 shots taken with output probability distributions that vary in the number of correct output states with non-zero probability, and thus benefit differently from different aggregation strategies. In chart 910, results for QFT-based adders, phase estimation, and amplitude estimation with a single output state are shown. It can be gleaned that symmetrization with plurality voting (represented by solid circles) significantly increases $F_H$ whereas symmetrized computations with componentwise averaging (represented by diamonds) show no improvement. In chart 930, results for amplitude estimation and Monte Carlo sampling circuits, before tracing out the ancillary qubits, are compared. Symmetrization with plurality voting (represented by solid circles) still shows the strongest improvement in $F_H$, but componentwise averaging (represented by diamonds) is also better than no symmetrization (represented by squares) because it evens out errors across the four target states. In chart 950, symmetrization on VQE circuits and QML circuits are compared. Such circuits have broader, irregular output probability distribution, so that symmetrization with componentwise averaging (represented by diamonds) shows the best improvement while symmetrization with plurality voting (represented by circles) can skew the results. Circuits with more peaked output probability distributions may often benefit more from aggregation with plurality voting.

Figure 10:
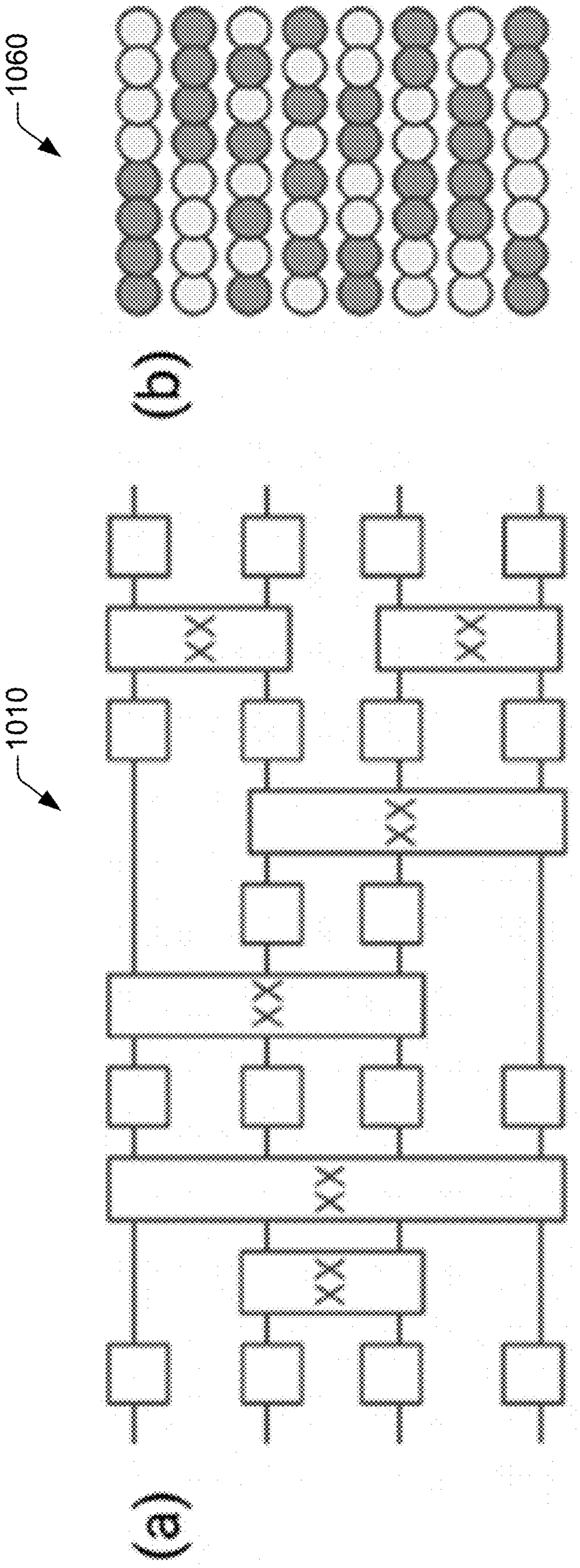
FIG. 10 illustrates results for a simulated 4-qubit small random circuit comprising XX gates and random single-qubit gates mapped onto eight qubits following particular assignments, in accordance with aspects of this disclosure.

FIG. 10 illustrates the effect of symmetrization on a 4-qubit random circuit (shown in diagram 1010) in eight implementations with varying qubit assignment onto eight ions (shown in diagram 1060, with qubit assignment represented by grey circles). Gate miscalibrations are modeled as random under-rotations of multiple two-qubit gates fixed per trapped-ion pair. An average under-rotation across all qubit pairs that causes a similar error for all variants is assumed (see FIG. 7, panel (a)). Symmetries Γ are represented by eight random qubit assignments γ. For each qubit assignment, corresponding inaccurate realizations are simulated in order to obtain vectors $h_u+\delta h_{\Gamma\text{-}inv}+\delta h_\gamma$.

In the first case (see FIG. 7, panel (a)), qubit assignment is varied between implementations (see diagram 1060) while in the other case (see FIG. 7, panel (b)), every fourth XX-gate is replaced with a phase-flipped $XX^{-1}$ gate with pairs of X-gates, thus implementing the same ideal unitary but reversing the effect of under-rotation (see FIG. 7, panel (b)).

Figure 11:
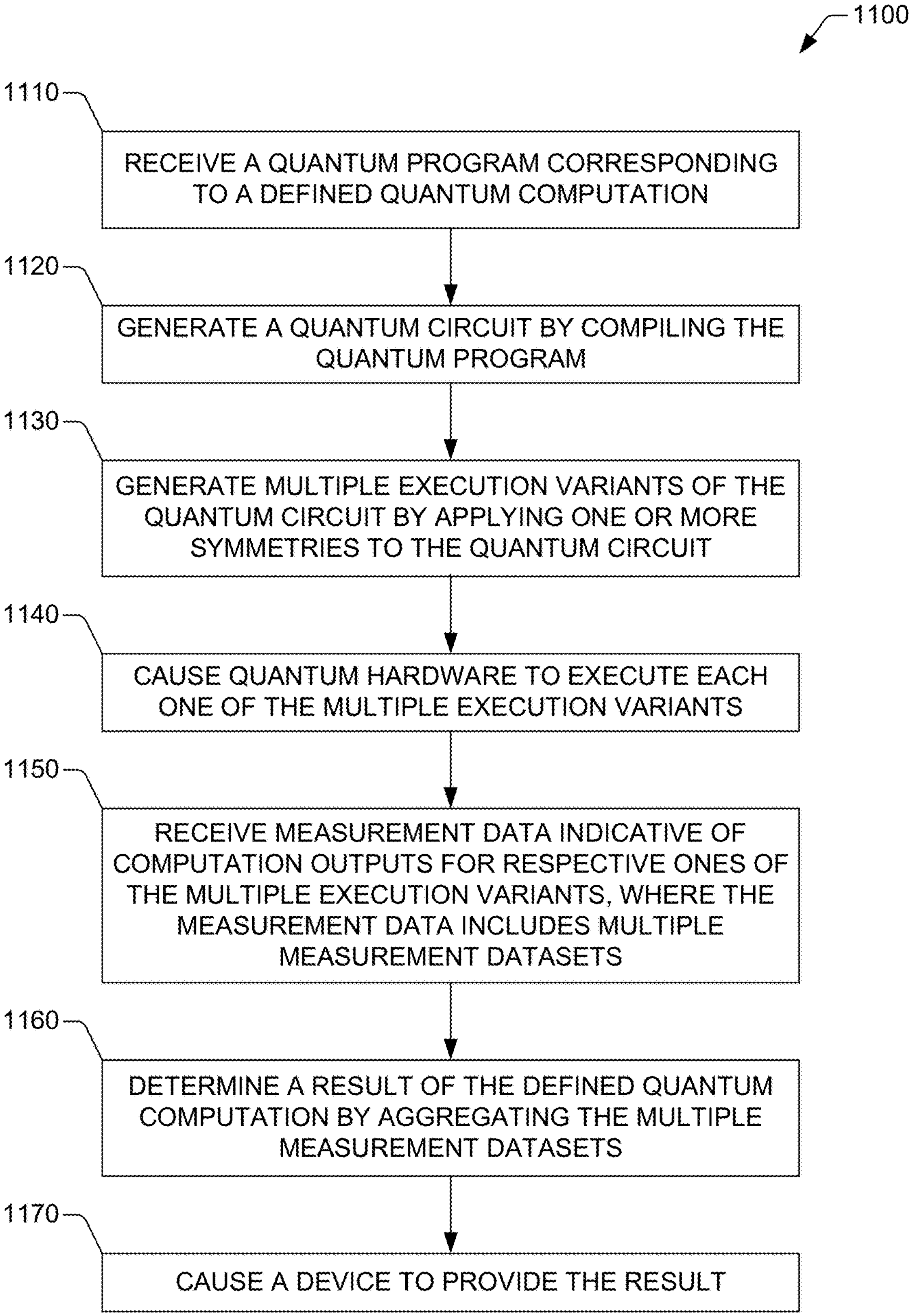
FIG. 11 illustrates an example of a method for implementing a quantum computation using an error mitigation approach based on symmetries of computation, in accordance with aspects of this disclosure.

FIG. 11 illustrates an example of computer-implemented method for implementing a quantum computation using an error mitigation approach based on symmetries of computation, in accordance with one or more aspects of this disclosure. A computing device or a system of computing devices can implement, at least partially, the example computer-implemented method 1100 illustrated in FIG. 11. Implementing the computer-implemented method 1100 can include compiling or executing, or both, one or several of the blocks included in the computer-implemented method 1100, for example. To that end, each computing device can include one or multiple processors, one or multiple memory devices, other types of computing resources (such as communication interface(s), bus architectures, etc.), a combination thereof, or similar resources.

In some cases, a computing system can implement, at least partially, the example computer-implemented method 1100. The computing system can host the ingestion module 510, the compilation module 520, the symmetrization module 530, the job execution module 540, the aggregation module 550, and the report module 560. The computing system can implement the example method 1100 by executing at least one of such modules. In one example, the computing system can be embodied in, or can constitute, the error-mitigation subsystem 500 in accordance with the various aspects described herein.

At block 1110, the computing system can receive or otherwise obtain, via the ingestion module 510 (FIG. 5A), for example, a quantum program corresponding to a defined quantum computation. The defined quantum computation can be an n-qubit computation. The quantum program can include one or several quantum circuits representing a quantum algorithm, such as a variational quantum algorithm.

At block 1120, the computing system can generate a quantum circuit by compiling the quantum program.

At block 1130, the computing system can generate multiple execution variants of the quantum circuit by applying one or more symmetries to the quantum circuit. As is described herein, each symmetry of the one or more symmetries can be a computational symmetry (such as a computation-specific symmetry). Thus, in some cases, to generate the multiple execution variants, the computing system can select the one or more symmetries from a set of computation-specific symmetries. Such a set can include at least one of a qubit assignment, gate decomposition, a permutation of commuting gates, an addition of a gate that preserves a defined state, or a change of one or more gates and measurements compensated by one or more changes in post-processing. In some cases, selecting the one or more symmetries can include selecting a first symmetry and a second symmetry from the set of computation-specific symmetries, where the first symmetry and the second symmetry can reduce error correlation between respective resulting execution variants. In one example, the computing system can select a particular symmetry from the set of computation-specific symmetries by executing the symmetry selector 534 (FIG. 5A), in some cases.

At block 1140, the computing system can cause quantum hardware (e.g., the quantum hardware 420 (FIG. 4)) to execute each one of the multiple execution variants. As is described herein, in some cases, the quantum hardware can include multiple trapped-atom qubits individually addressable by a continuous-wave laser beam. In other cases, the quantum hardware can include multiple superconducting qubits individually addressable by microwave electromagnetic radiation.

At block 1150, the computing system can receive measurement data indicative of computation outputs for respective ones of the multiple execution variants. The measurement data include multiple measurement datasets, wherein each measurement dataset is indicative of a computation output of a respective execution variant of the multiple execution variants. The computing system can receive the measurement data via the job execution module 540 (FIG. 5A), for example.

At block 1160, the computing system can determine a result of the defined quantum computation (e.g., the n-qubit computation) by aggregating the multiple measurement datasets. In this way, as is described herein, errors in the result of the defined computation can be mitigated. The computing system can determine the result in such a fashion via the aggregation module 540 (FIG. 5A), for example. In some cases, aggregating the multiple measurement datasets can include selecting, based on an output probability distribution corresponding to the defined computation, an aggregation process to combine the multiple measurement datasets. In addition, or in other cases, aggregating the multiple measurement datasets also can include applying the aggregation process to the multiple measurement datasets. The aggregation process comprises one of a linear aggregation process or a non-linear aggregation process. An example of a linear aggregation process is componentwise averaging. Examples of non-linear aggregation processes include weighted componentwise averaging, plurality voting, and weighted plurality voting. The multiple measurement datasets can define multiple sequences of bitstrings. Thus, in some implementations, applying the componentwise averaging can include determining, over the multiple sequences of bitstrings, an average number of occurrences for each bitstring in the multiple sequence of bitstrings. In weighted componentwise averaging, the average number of occurrences for each bitstring can be obtained by assigning a weight coefficient to each execution variant and weighing the number of occurrences for the execution variant using the weight coefficient. In other implementations, applying the plurality voting can include determining, over the multiple sequences of bitstrings, a particular bitstring exhibiting a number of occurrences that exceeds a defined threshold number. In weighted plurality voting, the number of occurrences for an execution variant also can be weighted according to weight coefficients for respective execution variants.

At block 1170, the computing system can cause, via the report module 560, for example, a computing device to provide the result. The computing device can be remotely located relative to the computing system. For example, the computing device can be the computing device 402 (FIG. 4). Providing the result can include displaying a user interface that includes one or more indicia representative of the result. The computing system can determine the result in such a fashion via the aggregation module 540 (FIG. 5A), for example.

Numerous other aspects emerge from the foregoing detailed description and annexed drawings. Those aspects are represented by the following Clauses.

A Clause 1 includes a computer-implemented method, where the computer-implemented method includes generating a quantum circuit by compiling a quantum program corresponding to a defined quantum computation; generating multiple execution variants of the quantum circuit by applying a first symmetry of one or more symmetries to the quantum circuit; causing quantum hardware to execute each one of the multiple execution variants; receiving multiple measurement datasets indicative of computation outputs for respective ones of the multiple execution variants; and determining a result of the defined quantum computation by aggregating the multiple measurement datasets.

A Clause 2 includes Clause 1 and further includes causing a computing device to provide the result.

A Clause 3 includes any of the preceding Clauses 1 or 2, and further includes selecting the one or more symmetries from a set of computation-specific symmetries corresponding to the defined quantum computation.

A Clause 4 includes any of the preceding Clauses 1 to 3, where the selecting comprises selecting a first symmetry and a second symmetry from the set of computation-specific symmetries, wherein the first symmetry and the second symmetry reduce error correlation between respective resulting execution variants.

A Clause 5 includes any of the preceding Clauses 1 to 4, where the aggregating the multiple measurement datasets includes selecting, based on an output probability distribution corresponding to the defined computation, an aggregation process to combine the multiple measurement datasets; and applying the aggregation process to the multiple measurement datasets.

A Clause 6 includes any of the preceding Clauses 1 to 5, where the aggregation process comprises componentwise averaging.

A Clause 7 includes any of the preceding Clauses 1 to 6, where the multiple measurement datasets define multiple sequences of bitstrings, and wherein applying the componentwise averaging comprises determining, over the multiple sequences of bitstrings, an average number of occurrences for each bitstring in the multiple sequence of bitstrings.

A Clause 8 includes any of the preceding Clauses 1 to 7, where the aggregation process comprises plurality voting.

A Clause 9 includes any of the preceding Clauses 1 to 8, where the multiple measurement datasets define multiple sequences of bitstrings, and wherein applying the plurality voting comprises determining, over the multiple sequences of bitstrings, a particular bitstring exhibiting a number of occurrences that exceeds a defined threshold number.

A Clause 10 includes any of the preceding Clauses 1 to 9, where the set of computation-specific symmetries comprises at least one of a qubit assignment, gate decomposition, a permutation of commuting gates, an addition of a gate that preserves a defined state, or a change of one or more gates and measurements compensated by one or more changes in postprocessing.

A Clause 11 includes a computing system, where the computing system includes at least one processor; and at least one memory devices storing processor-executable instructions that, in response to being executed by the at least one processor, cause the computing system at least to: generate a quantum circuit by compiling a quantum program corresponding to a defined quantum computation; generate multiple execution variants of the quantum circuit by applying a first symmetry of one or more symmetries to the quantum circuit; cause quantum hardware to execute each one of the multiple execution variants; receive multiple measurement datasets indicative of computation outputs for respective ones of the multiple circuit variants; and determine a result of the defined quantum computation by aggregating the multiple measurement datasets.

A Clause 12 includes Clause 11, and also includes the at least one memory device storing further processor-executable instructions that, in response to being executed, further cause the at least one processor to cause a computing device to provide the result.

A Clause 13 includes any of Clause 11 or Clause 12, and also includes the at least one memory device storing further processor-executable instructions that, in response to being executed, further cause the at least one processor to select the one or more symmetries from a set of computation-specific symmetries corresponding to the defined quantum computation.

A Clause 14 includes any of the preceding Clauses 1 to 13, where aggregating the multiple measurement datasets includes selecting, based on an output probability distribution corresponding to the defined computation, an aggregation process to combine the multiple measurement datasets; and applying the aggregation process to the multiple measurement datasets.

A Clause 15 includes any of the preceding Clauses 1 to 14, where the aggregation process comprises one of componentwise averaging or plurality voting.

A Clause 16 includes a quantum information processing (QIP) system, where the QIP system includes: at least one processor; and at least one memory device storing processor-executable instructions that, in response to being executed by the at least one processor, cause the QIP system at least to: generate a quantum circuit by compiling a quantum program corresponding to a defined quantum computation; generate multiple execution variants of the quantum circuit by applying a first symmetry of one or more symmetries to the quantum circuit; cause quantum hardware to execute each one of the multiple execution variants; receive multiple measurement datasets indicative of computation outputs for respective ones of the multiple circuit variants; and determine a result of the defined quantum computation by aggregating the multiple measurement datasets.

A Clause 17 includes Clause 16, and also includes the at least one memory devices storing further processor-executable instructions that, in response to being executed, further cause the at least one processor to cause a computing device to provide the result.

A Clause 18 includes any of Clause 16 or Clause 17, where aggregating the multiple measurement datasets includes selecting, based on an output probability distribution corresponding to the defined computation, an aggregation process to combine the multiple measurement datasets, the aggregation process comprising one a linear aggregation process or a non-linear aggregation process; and applying the aggregation process to the multiple measurement datasets.

A Clause 19 includes any of the preceding Clause 16 to 18, where the quantum hardware comprises multiple trapped-atom qubits individually addressable by a continuous-wave laser beam.

A Clause 20 includes any of the preceding Clause 16 to 19, where the quantum hardware comprises multiple superconducting qubits individually addressable by microwave electromagnetic radiation.

Various aspects of the disclosure may take the form of an entirely or partially hardware aspect, an entirely or partially software aspect, or a combination of software and hardware. Furthermore, as described herein, various aspects of the disclosure (e.g., systems and methods) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, and so forth.

Aspects of this disclosure are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, a special-purpose computer, or another programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps, or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of aspects described in the specification or annexed drawings; or the like.

As used in this disclosure, including the annexed drawings, the terms "component," "module," "system," and the like are intended to refer to a computer-related entity or an entity related to an apparatus with one or more specific functionalities. The entity can be either hardware, a combination of hardware and software, software, or software in execution. One or more of such entities are also referred to as "functional elements." As an example, a component can be a process running on a processor, a processor, an object, an executable, a thread of execution, a program, and/or a computer. For example, both an application running on a server or network controller, and the server or network controller can be a component. One or more components can reside within a process and/or thread of execution and a component can be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which parts can be controlled or otherwise operated by program code executed by a processor. As yet another example, a component can be an apparatus that provides specific functionality through electronic components without mechanical parts, the electronic components can include a processor to execute program code that provides, at least partially, the functionality of the electronic components. As still another example, interface(s) can include I/O components or Application Programming Interface (API) components. While the foregoing examples are directed to aspects of a component, the exemplified aspects or features also apply to a system, module, and similar.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should be construed to mean "one or more" unless specified otherwise or clear from context to be directed to a singular form.

In addition, the terms "example" and "such as" are utilized herein to mean serving as an instance or illustration. Any aspect or design described herein as an "example" or referred to in connection with a "such as" clause is not necessarily to be construed as preferred or advantageous over other aspects or designs described herein. Rather, use of the terms "example" or "such as" is intended to present concepts in a concrete fashion. The terms "first," "second," "third," and so forth, as used in the claims and description, unless otherwise clear by context, is for clarity only and doesn't necessarily indicate or imply any order in time or space.

The term "processor," as utilized in this disclosure, can refer to any computing processing unit or device comprising processing circuitry that can operate on data and/or signaling. A computing processing unit or device can include, for example, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some cases, processors can exploit nano-scale architectures, such as molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

Simply as an illustration, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects described herein can be implemented as a method, apparatus, or article of manufacture using standard programming and/or engineering techniques. In addition, various of the aspects disclosed herein also can be implemented by means of program modules or other types of computer program instructions stored in a memory device and executed by a processor, or other combination of hardware and software, or hardware and firmware. Such program modules or computer program instructions can be loaded onto a general-purpose computer, a special-purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any computer-readable device, carrier, or media. For example, computer readable media can include but are not limited to magnetic storage devices (e.g., hard drive disk, floppy disk, magnetic strips, or similar), optical discs (e.g., compact disc (CD), digital versatile disc (DVD), blu-ray disc (BD), or similar), smart cards, and flash memory devices (e.g., card, stick, key drive, or similar).

The detailed description set forth herein in connection with the annexed figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A computer-implemented method comprising, generating a quantum circuit by compiling a quantum program corresponding to a defined quantum computation;

generating multiple execution variants of the quantum circuit by applying one or more computation-specific symmetries to the quantum circuit, with the one or more computation-specific symmetries corresponding to the defined quantum computation, each of the one or more computation-specific symmetries comprising a respective transformation of a realization of the quantum circuit that preserves the defined quantum computation;

causing quantum hardware to execute each one of the multiple execution variants;

receiving multiple measurement datasets indicative of computation outputs for respective ones of the multiple execution variants; and determining a result of the defined quantum computation by aggregating the multiple measurement datasets.

2. The computer-implemented method of claim 1, further comprising causing a computing device to provide the result.

3. The computer-implemented method of claim 1, further comprising selecting the one or more computation-specific symmetries from a set of computation-specific symmetries corresponding to the defined quantum computation, with the selecting comprising sampling, via a symmetrization module, the set of computation-specific symmetries.

4. The computer-implemented method of claim 3, wherein the selecting comprises sampling a first symmetry and a second symmetry from the set of computation-specific symmetries, wherein the first symmetry and the second symmetry configured to reduce error correlation between respective resulting execution variants.

5. The computer-implemented method of claim 3, wherein the set of computation-specific symmetries comprises at least one of a qubit assignment, gate decomposition, a permutation of commuting gates, an addition of a gate that preserves a defined state, or a change of one or more gates and measurements compensated by one or more changes in postprocessing.

6. The computer-implemented method of claim 1, wherein the aggregating the multiple measurement datasets comprises, selecting, based on an output probability distribution corresponding to the defined quantum computation, an aggregation process to combine the multiple measurement datasets; and applying the aggregation process to the multiple measurement datasets.

7. The computer-implemented method of claim 6, wherein the aggregation process comprises componentwise averaging.

8. The computer-implemented method of claim 7, wherein the multiple measurement datasets define multiple sequences of bitstrings, and wherein applying the componentwise averaging comprises determining, over the multiple sequences of bitstrings, an average number of occurrences for each bitstring in the multiple sequence of bitstrings.

9. The computer-implemented method of claim 6, wherein the aggregation process comprises plurality voting.

10. The computer-implemented method of claim 9, wherein the multiple measurement datasets define multiple sequences of bitstrings, and wherein applying the plurality voting comprises determining, over the multiple sequences of bitstrings, a particular bitstring exhibiting a number of occurrences that exceeds a defined threshold number.

11. A computing system comprising:

at least one processor;

at least one memory devices storing processor-executable instructions that, in response to being executed by the at least one processor, cause the computing system at least to:

generate a quantum circuit by compiling a quantum program corresponding to a defined quantum computation;

generate multiple execution variants of the quantum circuit by applying one or more computation-specific symmetries to the quantum circuit, with the one or more computation-specific symmetries corresponding to the defined quantum computation, each of the one or more computation-specific symmetries comprising a respective transformation of a realization of the quantum circuit that preserves the defined quantum computation;

cause quantum hardware to execute each one of the multiple execution variants;

receive multiple measurement datasets indicative of computation outputs for respective ones of the multiple execution variants; and determine a result of the defined quantum computation by aggregating the multiple measurement datasets.

12. The computing system of claim 11, the at least one memory devices storing further processor-executable instructions that, in response to being executed, further cause the at least one processor to cause a computing device to provide the result.

13. The computing system of claim 11, the at least one memory devices storing further processor-executable instructions that, in response to being executed, further cause the at least one processor to select the one or more computation-specific symmetries from a set of computation-specific symmetries corresponding to the defined quantum computation, wherein selecting the one or more computation-specific symmetries comprises sampling the set of computation-specific symmetries.

14. The computing system of claim 11, wherein aggregating the multiple measurement datasets comprises, selecting, based on an output probability distribution corresponding to the defined computation, an aggregation process to combine the multiple measurement datasets; and applying the aggregation process to the multiple measurement datasets.

15. The computing system of claim 14, wherein the aggregation process comprises one of componentwise averaging or plurality voting.

16. A quantum information processing (QIP) system comprising:

at least one processor; and at least one memory device storing processor-executable instructions that, in response to being executed by the at least one processor, cause the QIP system at least to:

generate a quantum circuit by compiling a quantum program corresponding to a defined quantum computation;

generate multiple execution variants of the quantum circuit by applying one or more computation-specific symmetries to the quantum circuit, with the one or more computation-specific symmetries corresponding to the defined quantum computation, each of the one or more computation-specific symmetries comprising a respective transformation of a realization of the quantum circuit that preserves the defined quantum computation;

cause quantum hardware to execute each one of the multiple execution variants;

receive multiple measurement datasets indicative of computation outputs for respective ones of the multiple circuit variants; and determine a result of the defined quantum computation by aggregating the multiple measurement datasets.

17. The QIP system of claim 16, the at least one memory devices storing further processor-executable instructions that, in response to being executed, further cause the at least one processor to cause a computing device to provide the result.

18. The QIP system of claim 16, wherein aggregating the multiple measurement datasets comprises, selecting, based on an output probability distribution corresponding to the defined computation, an aggregation process to combine the multiple measurement datasets, the aggregation process one of a linear aggregation process or a non-linear aggregation process;

applying the aggregation process to the multiple measurement datasets.

19. The QIP system of claim 18, wherein the quantum hardware comprises multiple trapped-atom qubits individually addressable by a continuous-wave laser beam.

20. The QIP system of claim 18, wherein the quantum hardware comprises multiple superconducting qubits individually addressable by microwave electromagnetic radiation.

* * * * *